United States Patent [19]

Knapp et al.

[11] Patent Number: 5,060,868

[45] **Date of Patent: * Oct. 29, 1991**

[54] ELECTROMAGNETICALLY ACTUATABLE VALVE

[75] Inventors: Heinrich Knapp, Leonberg; Mathias Linssen, Scheblitz; Jürgen Peczkowski, Inbert-Oberwürzbach; Alfred Konrad, Bamberg, all of Fed. Rep. of Germany

[73] Assignee: Robert Bosch GmbH, Stuttgart, Fed. Rep. of Germany

[ * ] Notice: The portion of the term of this patent subsequent to Mar. 5, 2002 has been disclaimed.

[21] Appl. No.: 599,963

[22] Filed: Oct. 19, 1990

Related U.S. Application Data

[63] Continuation of Ser. No. 245,846, Mar. 20, 1981, Pat. No. 4,982,902.

[30] Foreign Application Priority Data

Mar. 20, 1980 [DE] Fed. Rep. of Germany ....... 3010612

[51] Int. Cl.[5] ..................... F02M 51/08; F02M 55/00; F16K 31/06

[52] U.S. Cl. ..................................... 239/585; 239/124

[58] Field of Search ........................ 239/585, 124, 125

[56] References Cited

U.S. PATENT DOCUMENTS 4,982,902 1/1991 Knapp et al. ...................... 239/585

FOREIGN PATENT DOCUMENTS 2130174 12/1972 Fed. Rep. of Germany .

*Primary Examiner*—Andres Kashnikow
*Assistant Examiner*—Lesley D. Morris
*Attorney, Agent, or Firm*—Edwin E. Greigg; Ronald E. Greigg

[57] ABSTRACT

An electromagnetically actuatable valve is proposed, which serves in particular to inject into the intake tube a mixture-compressing internal combustion engines with externally-supplied ignition. The valve includes a flat armature which is firmly connected with a ball arranged to cooperate with a fixed valve seat. The flat armature is pivotably supported on its end remote from the valve seat on a spring tongue preferably embodied out of a remnant air disc. A tubular inflow stub is disposed concentrically to the valve axis, communicating on one end with a fuel distributor line and on the other end protruding as deeply as possible into the valve. A tubular outlet stub leading away from the valve seat is concentrically guided in the inlet stub, and arranged to have its end remote from the valve seat discharge into a fuel return flow line. As a result, a cooling of the valve and the return of heated fuel which contains vapor bubbles to its supply source is assured.

8 Claims, 2 Drawing Sheets

45
50
51
25
46
48
44
23
26
21
49
4
II
II
22
47
24
5
7
2
40
3
1
29
22
27
32
41
15
III
III
14
20
19
20
35
36
17
13
30
16
9
18
19
8
39

ELECTROMAGNETICALLY ACTUATABLE VALVE

RELATED PATENT APPLICATION

This application is a continuation of application Ser. No. 06/245,846 filed on Mar. 20, 1981, now Pat. No. 4,982,902.

BACKGROUND OF THE INVENTION

The invention is based on an electromagnetically actuatable valve of the general type described hereinafter. An electromagnetically actuatable valve is already known (see, for example, German Offenlegungsschrift 21 30174) which has a feed line to a supply line having fuel flowing through it, with a return flow line being disposed in the feed line by way of which return flow line, the excess fuel can flow back to the supply line. However, this valve has the disadvantage that the fuel, which has been warmed up in the injection valve and which may have vapor bubbles, is delivered to the next subsequent injection valve and there can cause insufficient fuel injection. This insufficiency may be so extensive that the engine will come to a stop. Another electromatnetically actuatable valve is also known which has a flat armature which is guided by a diaphram firmly held at its circumference and attached to the housing. With a suspension of the flat armature in this manner, that is, by way of a diaphram, there is the danger that the flat armature may execute uncontrolled fluttering movements before, during and after actuation.

OBJECTS AND SUMMARY OF THE INVENTION

The valve according to the invention has the advantage over the prior art that while the concentric structure is as spacesaving as possible it is assured that fuel which has been warmed and in which vapor bubbles have appeared is no longer utilized directly to supply further valves.

As a result of the characteristics disclosed hereinafter, advantageous modifications of and improvements to the valve disclosed in the main claim are attainable.

It is particularly advantageous to utilize the outer stub as a part of the magnetic circuit and to provide it with protrusions pointing inward by a squeezing process, these protrusions guiding the inner stub. It is also advantageous to embody the armature as a flat armature in disclike form, of sheet metal, and to connect it in a fixed manner with a ball cooperating with a fixed valve seat. It is of further advantage to guide the flat armature unequivocally during the attraction and dropping movement by means of a spring tongue joint, while avoiding external friction and wear.

The invention will be better understood and further objects and advantages thereof will become more apparent from the ensuing detailed description of a preferred embodiment taken in conjunction with the drawing.

DESCRIPTION OF THE PREFERRED EMBODIMENT

Figure 1:
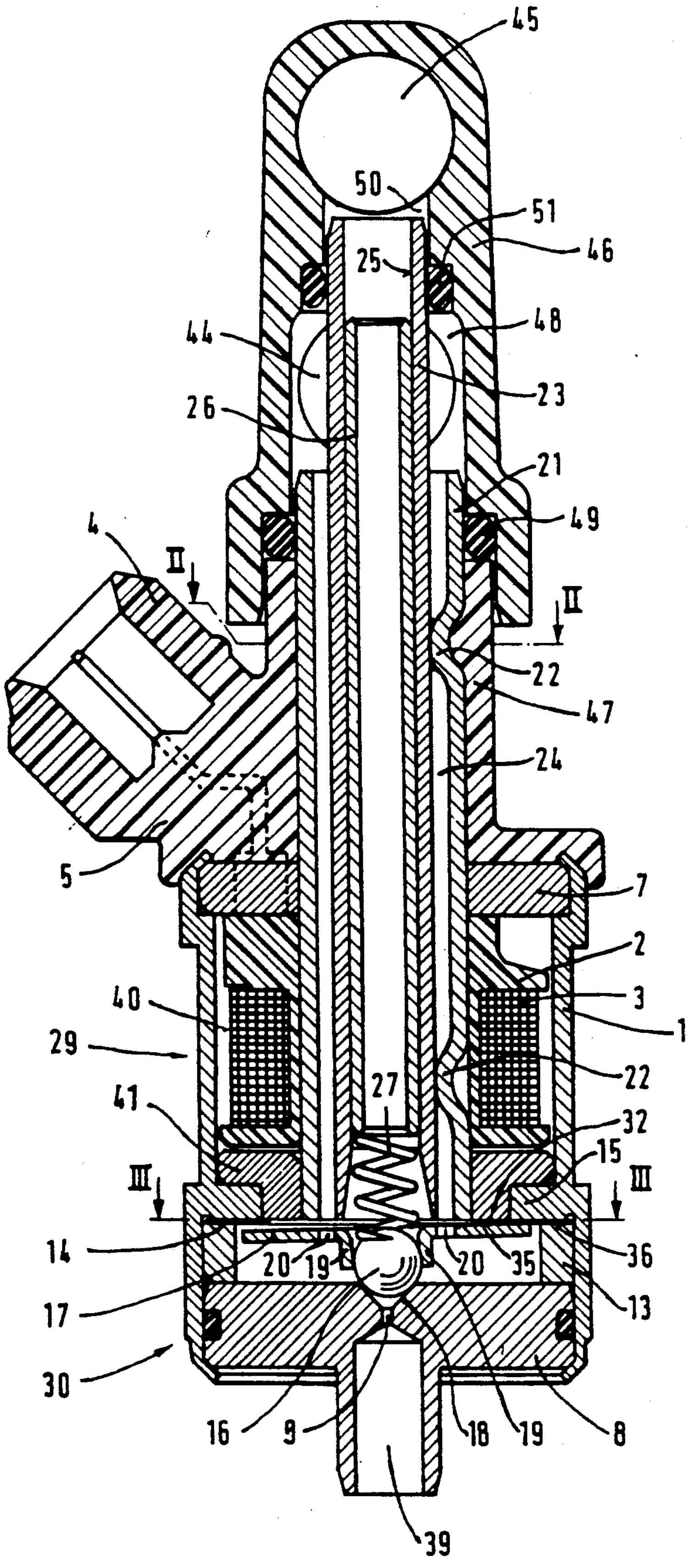
FIG. 1 shows a fuel injection valve in cross-section.

The fuel injection valve for a fuel injection system shown in FIG. 1 serves the purpose of injecting fuel, particularly at relatively low pressure, into the intake tube of a mixture-compressing internal combustion engine having externally-supplied ignition. A magnetic coil 3 is disposed on a coil carrier 2 inside a valve housing 1. The magnetic coil 3 has a means of electrical current supply provided by an electrical plug terminal 4, which is embedded in a plastic ring element 5 seated axially upon the valve housing 1. A closure plate 7 is placed in the end of the valve housing 1 oriented toward the electrical plug terminal 4 and thereafter the valve housing is sealed at this end by flanging and welding or soldering. On the end of the fuel injection valve remote from the electrical plug terminal 4, a nozzle carrier 8 is flanged in a sealing manner together with the valve housing unit 1 and has a nozzle 9 disposed within it.

Figure 2:
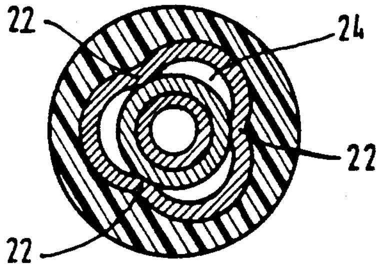
FIG. 2 is a section taken along the line II—II of FIG. 1.

A stroke ring 13 may be placed upon the nozzle carrier 8 and a remnant air disc 14 can be placed on the stroke ring 13. This remnant air disc 14 is held firmly in place as a result of the pressure force resulting from the flanging of the valve housing 1 onto the nozzle carrier 8. The stroke ring 13 may also be embodied directly on the nozzle carrier 8. The remnant air disc 14, made of non-magnetic spring material, for instance a cobalt-nickel-chrome alloy, extends at least partially radially over a step 15 of the valve housing 1 remote from the electrical plug terminal 4, and prevents magnetic adhesion of the flat armature 17 to the step 15. The flat armature 17 is embodied in disc-like form and is made in particular of sheet metal. A ball 16, which is firmly connected with tongues 19 of the flat armature 16 and cooperates with a fixed valve seat 18 in the nozzle carrier 8 which extends conically toward the nozzle 9, constitutes together with the flat armature 17 the removable valve element. Flow-through openings 20 are provided in the flat armature 17. The supply of fuel, for instance gasoline, is effected by way of a tubular inflow stub 21 disposed concentrically to the valve axis, which simultaneously acts as the core and on which the coil carrier 2 is disposed. The inlet stub 21 is provided with inwardly directed protrusions 22 (see FIG. 2 as well) formed by means of squeezing, which are displaced from one another by 120 degrees and, extending in a second axial plane, concentrically guide a tubular discharge stub 23 which protrudes almost up to the flat armature 17 and which forms a flow cross section 24 for the inflowing fuel between its outer circumference and the minimum diameter of the inlet stub 21. A tube insert 26 is positioned in the lower stub 25 of the discharge stub 23, and a closing spring 27 is supported on the tube insert 26 on one end and the other end rests on the ball 16, pressing the ball 16 against the valve seat 18 of the nozzle carrier 8 closing the valve, in the non-excited state of the magnetic element 29. The fuel flowing into the fuel injection valve via the flow cross section 24 proceeds over the flow through openings 20 and the flat armature 17 to the actual valve, made up of the valve seat 18 provided in the carrier with the fuel which has not been injected and vapor bubbles being capable of flowing out from there once again by way of the discharge stub 23.

The valve housing 1 encloses the magnetic element 29 and the valve element 30, and thus, acts as a common housing for both.

Figure 3:
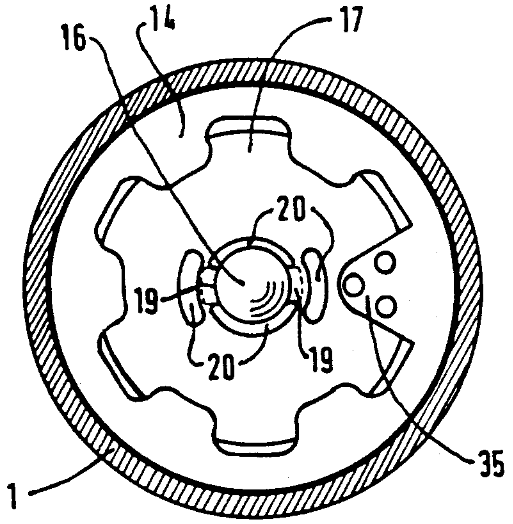
FIG. 3 is a section taken along the line III—III of FIG. 1.

A spring tongue 35 has been cut out of the remnant air disc 14 shown in FIG. 3, as well, the spring tongue 35 being secured on the flat armature 17 on the end protruding out of the spring tongue holder means 36 on the valve housing 1, on the side 32 of the flat armature 17 remote from the fixed valve seat 18; this fastening is effected by means of welding or soldering, for example. The flat armature 17 can thus execute a pivotal motion about the spring tongue holder means 36 on the housing 1. The spring tongue 35 must not necessarily be shaped from the substance of the remnant air disc 14; instead, it may also be embodied as a separate element from spring steel, and may be held attached to the housing. As a result of the unilateral fixation of the flat armature 17 by the spring tongue 35, it is assured that the flat armature 17 will only make a pivotal motion about the spring tongue holder means 36.

In the excited state, the flat armature 17 is attracted by the magnetic coil 3 and the ball 16 opens the valve seat 18 by way of which fuel can flow into the nozzle 9, which performs throttling and meters the fuel, and can be injected by way of an ejection port 39 which widens in conical form adjacent thereto.

The magnetic coil chamber 40 is sealed off by a ring 41 of non-magnetic material from the fuel, being soldered at its circumference first with the inlet stub 21 and then with the step 15 of the valve housing. The embodiment of the fuel injection valve makes it possible for fuel, which is continually arriving by way of the inlet stub 21 or the flow cross section 24 from a fuel distributor line 44, to be carried past the valve seat 18 and flow via the discharge stub 23 into a fuel return flow line 45, so that any vapor bubbles which may have been formed as a result of the heating of the fuel are carried along with the fuel to the fuel return flow line 45, while on the other hand, a continuous cooling of the fuel injection valve by the flowing fuel is assured.

The fuel connection of the fuel connection valve is affected by way of plug nipple 46, which surrounds the fuel distributor line 44 and the fuel return flow line 45 above that, and is inserted on a ring step 47 of the plastic ring element 5. The inlet stub 21 protrudes partially into a bore 48 of the plug nipple 46, which is in communication with the fuel distributor line 44, so that fuel can flow into the valve by way of the flow cross section 24. The fuel side 44, 45 is sealed off from the atmosphere by an O-ring 49, which is disposed in the plug nipple 46 and surroundingly engages the inlet stub 21. The discharge stub 23 protrudes into a bore 50 of the plug nipple 46, which communicates with the fuel return flow line 45 and has a smaller diameter than the bore 48. An O-ring 51 effects sealing within the plug nipple 46 between the fuel distributor line 44 and the fuel return flow line 45, but because of the low pressure drop this O-ring may also be omitted. The same scavenging and cooling affect is naturally also attained if the fuel distributor line and the fuel return flow line are exchanged for one another, so that fuel flows in by way of the bore 25 of the stub 23 and flows out by way of the flow cross section 24.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An electromagnetically actuatable fuel injection valve means which comprises a magnetic coil and an armature operative by said magnetic coil for fuel injection systems of internal combustion engines, said valve means including a valve, said valve means is connected with a fuel distributor line and a fuel return line separate therefrom and has a tubular inlet stub disposed concentrically with the valve means axis and arranged to communicate with said fuel distributor line, said tubular inlet stub protrubes into said valve means, a concentrically disposed tubular outlet stub extending upwardly from said valve, said valve including a movable valve element coacting with a valve seat and defining a flow cross section between said inlet stub and said outlet stub, and said outlet stub has an end remote from said valve seat arranged to feed fuel into said fuel return flow line.

2. A valve means as defined by claim 1, wherein at least said inlet stub protrubes in said magnetic coil.

3. A valve means as defined by claim 1, wherein said outlet stub includes a portion arranged to terminate near said armature.

4. A valve means as defined by claim 1, wherein said magnetic coil of said electromagnetically actuatable valve means and said valve are surrounded by a common valve housing.

5. A valve means as defined by claim 2, wherein a magnetic coil chamber which surrounds said magnetic coil is sealed off from fuel flow.

6. A valve means as defined by claim 3, wherein a magnetic coil chamber which surrounds said magnetic coil is sealed off from fuel flow.

7. A valve means as defined by claim 4, wherein a magnetic coil chamber which surrounds said magnetic coil is sealed off from fuel flow.

8. A valve means as defined by claim 2, wherein said magnetic coil has at least one surface area which terminates in close proximity to a non-magnetic ring member, said non-magnetic ring member arranged to form a fluid-tight seal between said inlet stub and said housing.

* * * * *